Patented Oct. 6, 1936

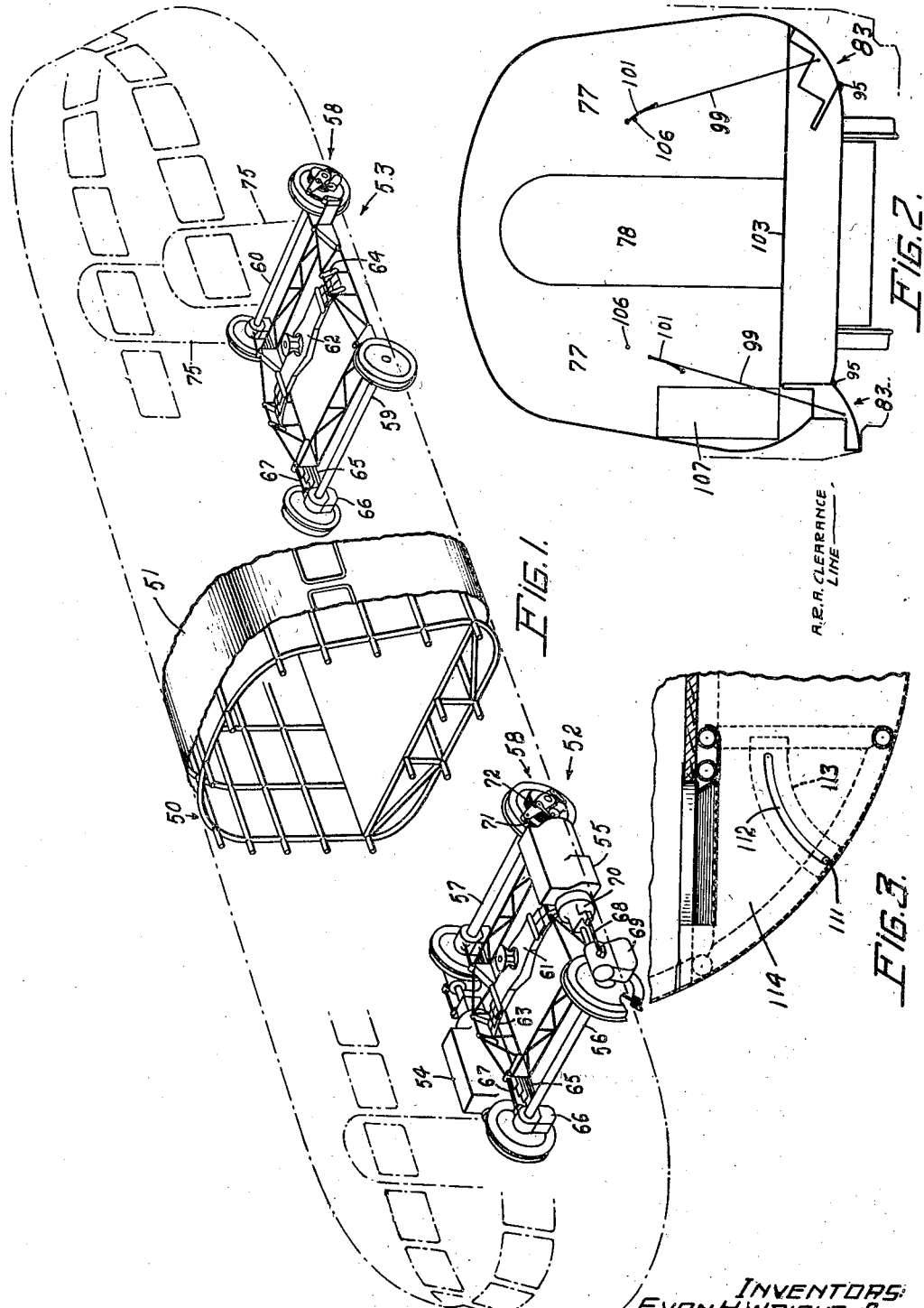

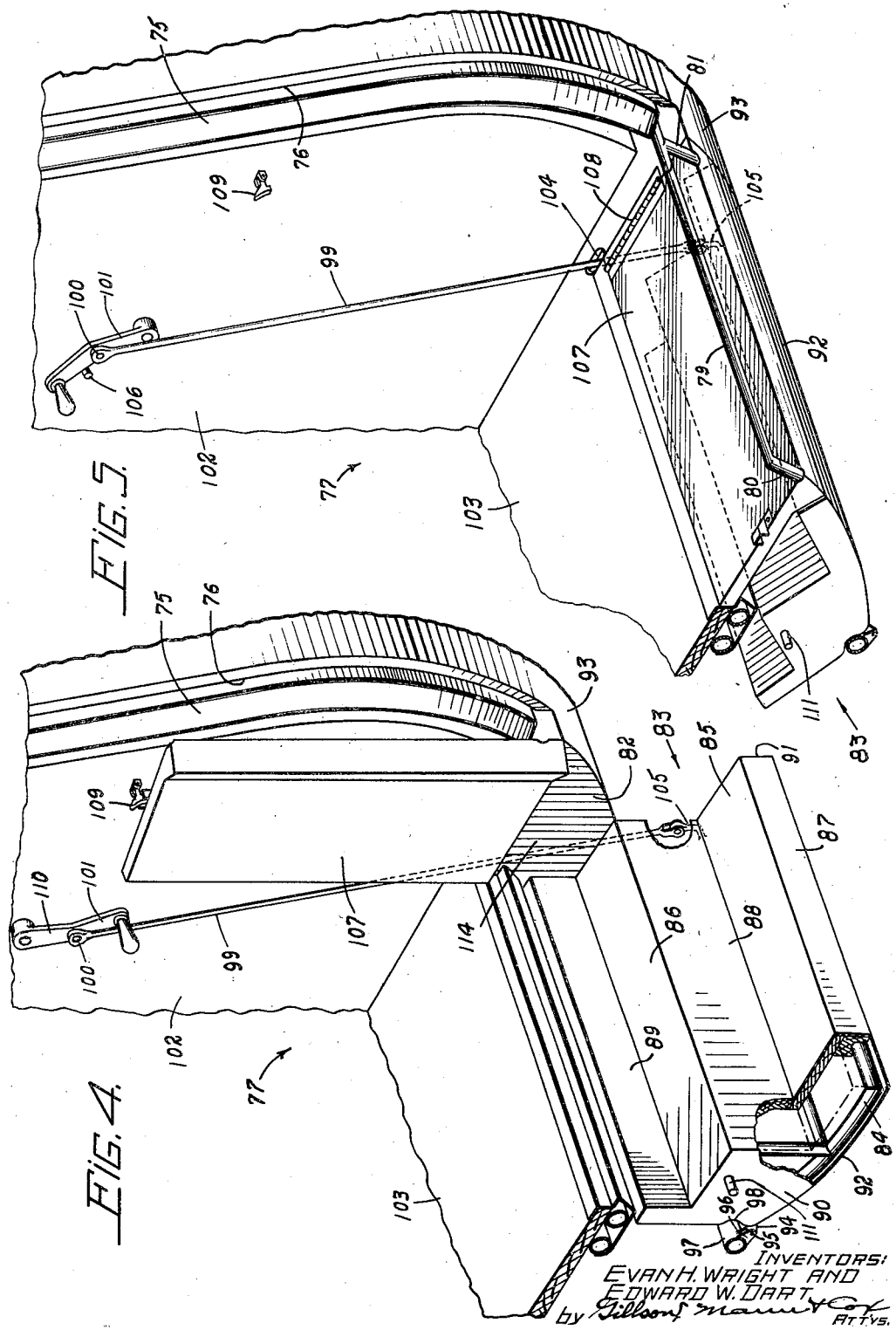

2,056,225

UNITED STATES PATENT OFFICE 2,056,225

RAILWAY CAR

Evan H. Wright, Detroit, and Edward W. Dart, Dearborn, Mich., assignors to Pullman-Standard Car Manufacturing Company, a corporation of Delaware Application October 16, 1933, Serial No. 693,735

10 Claims. (Cl. 105—447)

Oftentimes the advantage gained by shaping a vehicle to reduce wind resistance is nullified to a large extent by appurtenances which project from the vehicle body, such as steps, horns, lights, and the like.

The principal object of this invention, therefore, is to provide a car body which presents a perfectly smooth outer surface when under way; which is equipped with a disappearing step that can be raised or lowered in a moment's time, and can be locked in raised position to guard against accidental lowering by car movement; and to provide means associated with the disappearing step so that when the step is raised, the exterior surface of the car will be unbroken.

A preferred form of the invention has been illustrated in the drawings and will hereafter be described, but it will be understood that the invention may be modified within the scope of the appended claims.

Further and other objects and advantages will become apparent as the disclosure proceeds and the description is read in conjunction with the accompanying drawings, in which Fig. 1 is a perspective view of a high speed rail car embodying the herein disclosed invention;

Fig. 2 is a diagrammatic, cross sectional view showing the operation of the disappearing steps;

Fig. 3 is a fragmentary view taken along the left edge (Fig. 4) of the steps, looking in the direction of the adjacent body section; and Figs. 4 and 5 are perspective views showing the steps in lowered and raised position, respectively.

The vehicle chosen to illustrate the invention is a high speed rail car comprising a space framework 50 covered by a metal skin 51 which is secured to the framework and assists in resisting torsional strain.

The body is supported by a front truck 52 and a rear truck 53, the former having internal combustion engines 54 and 55 mounted outboard on opposite sides of the truck. The front truck includes wheeled axles 56 and 57, diametrical ends of which are driven by the motors 54 and 55. The other diametrical ends of the axles 56 and 57 are equipped with brake operating mechanism, generally indicated at 58.

The rear truck 53 includes wheeled axles 59 and 60, each of which is braked by mechanism corresponding to the mechanism 58 of the front truck.

The axles of both front and rear trucks are equipped with what may be termed "resilient" wheels, and this term is intended to include all forms of wheels which are inherently resilient either by the interposition of rubber under shear, pneumatic tires, springs, or by any other means.

The car body rests upon swing bolsters 61 and 62 of the front and rear trucks, respectively, and preferably, the bolsters are equipped with cantilever springs 63 which are shackled to swing hangers 64 pivotally suspended from the truck frames.

The truck frames of each truck are fabricated of metal tubing welded together in such manner as to produce space frameworks of necessary strength, and at the four corners of each frame, a leaf spring 65 projects toward the adjacent axle where it connects to a journal box 66. The point of connection between the projecting spring and the journal box is, in each case, beneath the axle, so that the truck is underslung with respect to the axles.

Driving and braking forces applied to the car axles are transmitted to the truck frames by radius rod 67. Other radius arms 68 which connect the worm gear casing 69 to a fixed point on the car truck,—in this case, the transmission housing 70,—take the thrust of the driving worm. Braking forces are resisted by torque arms 71 which connect the brake housing 72 to the truck frame.

The car body, as will be seen, is elongated and has a tapering blunt nose and tail to reduce wind resistance. The outer surface of the car consists of smooth broad curves, well blended together to produce a graceful appearance, and at the same time directing the air currents around the car with minimum effort. The body of the car is uninterrupted in outline except for the wheels of the truck which project through the metal skin enveloping the body framework.

Preferably the body has a generally ovate cross-sectional shape, as shown in Fig. 2, in order to direct lateral air currents over and beneath the body with the least possible effort and to minimize eddy currents or the like on the lee side.

At the rear of the car, in opposite side walls, are doors 75 (Fig. 1) which give access to the interior of the car. The doors when open fit into a pocket 76, as shown in Figs. 4 and 5, and consequently are clear of the vestibule, generally indicated at 77. The vestibules on opposite sides of the car connect with a central passageway 78 (see Fig. 2) which opens into the front and rear portions of the car interior.

The door 75 rests upon rollers, not shown, which are adapted to travel in a track 79 equipped with spurs 80 and 81. When the front roller of the door strikes the spur 80, the door is moved outwardly to a position flush with the car exterior.

Immediately below the door opening is a cutaway portion 82 adapted to receive disappearing steps, generally indicated at 83. Obviously one or more steps may be used according to the particular requirements.

The steps in the present case comprise a framework 84 fabricated from metal tubing rigidly welded together. The treads 85 and 86 and risers 87, 88, and 89 are finished off with sides 90 and 91; and a back sheet 92, the curvature of which corresponds to the curvature of the adjacent portion 93 of the car body.

Projecting rearwardly from the steps are ears 94 which are pivoted at 95 to lugs 96 welded to a tube 97 of the body framework. A shallow groove 98 runs across the rear of the steps so that when the steps are in raised position, as shown in Fig. 5, the groove accommodates the tube 97.

The steps are raised and lowered by mechanism best shown in Figs. 2, 4 and 5. The mechanism consists of a rod 99, the upper end of which is connected at 100 to a crank 101 rotatably mounted on the side wall 102 of the vestibule 77. The rod 99 passes through the floor 103 of the vestibule at 104, and is connected at its lower end to an arm 105 projecting laterally from the side wall 91 of the steps.

When the steps are in raised position (Fig. 5) the crank 101 has been moved slightly past dead center and rests upon a stud 106. Car movement, therefore, cannot dislodge the crank and accidentally cause the steps to be lowered. Also, it will be observed that when the steps are in raised position, the back sheet 92 of the steps blends perfectly with the car exterior so that when the door 75 is closed, the car presents a smooth uninterrupted, broadly curved surface capable of effectively reducing wind resistance.

To lower the steps, the door 75 is first opened and then the trap door 107, which is pivoted at 108 and which carries a portion of the track 79, is lifted and secured against the side wall 102 by a catch 109. The crank 101 is then rotated clockwise (Fig. 5) until it reaches the lower limit of its travel which is determined by the alinement of the rod 99 with the portion 110 of the crank. The rod 99, therefore, serves to support the right side of the steps when in lowered position.

The left side of the steps is supported by a stud 111 which travels in a slot 112 (Fig. 3) of a bracket 113 rigidly secured to the body framework. The side of the cut-away portion 82 adjacent to the side wall 90 of the steps is finished with a metal skin 114 in exactly the same manner as the opposite side with the exception that the skin is slotted to permit the stud to enter the slot 112 of the bracket 113.

It will be noticed that the steps, even when open are within the A. R. A. clearance (Fig. 2) so that should the steps be inadvertently left open, the A. R. A. clearance would not be violated.

What we claim is:—

1. In a railway car, a car body having a smooth, substantially unbroken, exterior surface adapted to minimize wind resistance and having a door opening, a door for said opening, and disappearing steps having a smooth unbroken back surface associated with the door, a floor for said body, said unbroken back surface of the steps forming a substantial continuation of the car exterior below said floor when in their inoperative position, and a floor section associated with said floor and movable into continuation therewith in the region of the door opening.

2. In a railway car, a car body having a smooth, substantially unbroken, and unobstructed exterior surface adapted to minimize wind resistance, said body also having a cutaway portion in one of its walls, a disappearing step in said cutaway portion adapted when in raised position to be entirely within the contour of the car body, means associated with said step for completing the smooth exterior surface of the body at the cutaway portion when the step is in its inoperative position, means including a lever and a link pivoted thereto and movable by said lever in one direction past dead center for holding said step in operative position and movable in the opposite direction past dead center for holding said step in inoperative position, and a floor in said car including a section movable to uncover said step.

3. In a railway car, a car body having side walls forming a substantially smooth exterior surface adapted to minimize wind resistance, one of said side walls having a door opening therein, a door and a movable floor section for said opening, means for slidably mounting said door on said body, a folding step beneath said door and said movable floor section, and means associated with said step for constituting a closure for said opening beneath said door when said step is moved to inoperative position, said means having an unobstructed exterior surface completing the smooth exterior surface of the body.

4. In a railway car, a body having a floor and a side wall provided with an opening extending above and below said floor, said floor having a cutaway portion, a trap door hinged to said body and movable to a horizontal position in alignment with said floor or to an inoperative upright position, a track extending across the trap door, a sliding door, guided by said track, for said opening above said trap door, a step support movable to a position for forming a closure for said opening below said trap door, and means for moving said step support to operative and inoperative position.

5. In a railway car, a body having side walls and a floor, an opening in one of said side walls extending below said floor, a sliding door for said opening above said floor, a cutaway portion in the floor opposite said opening, a trap door movable to a horizontal position in alignment with said floor, a track for said sliding door on said trap door, a step support beneath said trap door and movable to a position in alignment with the outer surface of said trap door, whereby the outer surfaces of said support and doors will be flush and continuous with said side wall of said body for reducing skin friction of the air contacting the side of said body to a minimum.

6. In a railway car, a car body having a floor and smooth, substantially unbroken, exterior surface adapted to minimize wind resistance, the side walls of said body curving inwardly below the plane of said floor, said body also having a cutaway portion in the curved portion of one of its side walls, a disappearing step in said cutaway portion adapted when in raised position to be entirely within the contour of the car body, and means associated with said step for completing the smooth exterior curved surface of the body at the cutaway portion when the step is in its inoperative position, said floor being formed in sections, one section of which is movable into and out of alignment with the other section in the cutaway portion to complete the floor in said portion.

7. In a railway car, a body having a floor, and having a side wall provided with an inwardly curved portion at its lower end, said body having openings in said wall and floor adjacent to said wall, a door for the upper portion of said wall opening, a step foldable into the lower portion of said wall opening and having a curved exterior flush with the said side wall and said door when said door is closed and said step is in inoperative position, and a floor section movable into said floor opening when the steps are in inoperative position.

8. In a railway car, a car body having a floor and a smooth broadly curved exterior surface, the side walls of which have their lower portions curved inwardly in the region of the car floor and have cutaway portions in said region below the floor level, one or more steps pivotally supported from said body in said cutaway portion, means for supporting the step in lowered position, and means for raising the step by rotation about the pivotal support, said step having a smooth unobstructed back surface adapted to conform to and be flush with the exterior surface of the car when the step or steps are in raised position whereby the streamline shape of the car is unbroken during normal operation of the car, and means for closing the floor opening at the cutaway portion when the steps are moved to their inoperative position.

9. In a railway car, a car body, a floor for said body, a door in the side wall of said body, said body having a smooth broadly curved exterior surface adapted to minimize wind resistance, said floor being provided with a cutaway portion opposite said door, one or more steps pivotally supported from said body in the region of said cutaway portion, means for supporting the step in lowered position, and means for raising the step by rotation about the pivotal support, said step having an unobstructed back surface adapted to form a substantial continuation of the car exterior when the step is in raised position, said floor including a fixed portion and a movable section adjacent the door adapted in one position to bridge the space between the fixed portion and the door and in another position to permit the step to be used.

10. In a railway car, a car body having a smooth, substantially unbroken exterior surface adapted to minimize wind resistance, and having a door opening and a floor, said floor having an opening adjacent the door opening, a door for said door opening, disappearing steps having a smooth unbroken back surface associated with the door, said unbroken back surface of the steps forming a substantial continuation of the car exterior below said floor when in their inoperative position, and means for closing said floor opening when the steps are moved into their inoperative position.

EVAN H. WRIGHT.
EDWARD W. DART.